(12) United States Patent
Minato et al.

(10) Patent No.: US 7,148,596 B2
(45) Date of Patent: Dec. 12, 2006

(54) MAGNETIC ROTATING MOTOR GENERATOR

(76) Inventors: Kohei Minato, No. 901, 28-20, Yotsuya 4-Chome, Shinjuku-Ku, Tokyo 106-0004 (JP); Nobue Minato, No. 901, 28-20, Yotsuya 4-Chome, Shinjuku-Ku, Tokyo 106-0004 (JP)

(*) Notice: Subject to any disclaimer, the term of this patent is extended or adjusted under 35 U.S.C. 154(b) by 0 days.

(21) Appl. No.: 10/835,049

(22) Filed: Apr. 28, 2004

(65) Prior Publication Data

US 2005/0184613 A1 Aug. 25, 2005

(30) Foreign Application Priority Data

Feb. 25, 2004 (JP) ............................ 2004-048982

(51) Int. Cl.
*H02K 47/04* (2006.01)
(52) U.S. Cl. ...................... 310/113; 310/152
(58) Field of Classification Search .............. 310/113, 310/114, 166
See application file for complete search history.

(56) References Cited

U.S. PATENT DOCUMENTS

| | | | |
|---|---|---|---|
| 4,629,921 A | 12/1986 | Gavaletz | 310/156 |
| 4,785,228 A | 11/1988 | Goddard | 322/29 |
| 5,181,131 A * | 1/1993 | Yamazaki et al. | 345/87 |
| 5,514,923 A | 5/1996 | Gossler et al. | 310/74 |
| 5,594,289 A | 1/1997 | Minato | |
| 5,786,645 A * | 7/1998 | Obidniak | 310/68 R |
| 6,013,963 A | 1/2000 | Shelton, Jr. | 310/179 |
| 6,373,162 B1 | 4/2002 | Liang et al. | 310/156.53 |
| 6,462,430 B1 * | 10/2002 | Joong et al. | 290/40 C |
| 6,784,585 B1 * | 8/2004 | Shah et al. | 310/181 |
| 6,798,104 B1 * | 9/2004 | Kajiura et al. | 310/162 |
| 2003/0151323 A1 | 8/2003 | Grimm | 310/156.01 |

FOREIGN PATENT DOCUMENTS

| | | |
|---|---|---|
| EP | 0 117 157 A1 | 8/1984 |
| EP | 0 806 832 | 11/1997 |
| EP | 1 035 635 A2 | 9/2000 |
| FR | 2 839 218 | 10/2003 |
| JP | 62-171458 | 7/1987 |
| JP | 01-170361 | 7/1989 |

OTHER PUBLICATIONS

Bedini, J.C., "The Bedini Free Energy Generator," *Proceedings of the 26th Intersociety Energy Conversion Engineering Conference*, vol. 4, pp. 451-456 (Aug. 4-9, 1991).

* cited by examiner

*Primary Examiner*—Darren Schuberg
*Assistant Examiner*—Nguyen Hanh
(74) *Attorney, Agent, or Firm*—Stephen Christopher Swift; Swift Law Office

(57) ABSTRACT

A magnetic rotating motor generator of the present invention comprises a rotating portion which is made of a non-magnetic substance whose periphery is provided with a group of permanent magnets tilted at a predetermined angle in an embedded manner; a group of electromagnets that are disposed adjacently to the rotating portion so as to oppose the group of permanent magnets; a positional sensor for detecting positions of the group of permanent magnets; a controller for applying an electric current to the electromagnet on the basis of a detected signal from the positional sensor; and a power generating section for obtaining power from a coil of the electromagnet. A rotation mode and a power generation mode are repeated, so that power generation is performed while a function as a motor is exhibited.

14 Claims, 17 Drawing Sheets

MAGNETIC ROTATING MOTOR GENERATOR

BACKGROUND OF THE INVENTION

1. Field of the Invention

The present invention relates to a magnetic rotating motor generator that a motor which is subject to magnetic rotational drive and semipermanently performs predetermined work (e.g., rotation of a fan or drive of a mechanical shaft) in a rotation mode and, at the same time, has a power generation mode for performing power generation, and power regeneration is possible.

2. Description of the Related Art

Conventionally, power is obtained by rotating a generator by using water power, wind power, thermal power and nuclear power as energy. In the case of water power generation, dams for rotating hydraulic turbines must be constructed, resulting in environmental destruction. The amount of water is not always sufficient. Further, sediment is deposited on the dams and thus the dams are not used permanently. In the case of wind power generation, since the wind power which is a natural phenomenon is utilized, only costs for installing generators are required. Nevertheless, since the wind power generation depends on the natural phenomenon, it has a problem such as instable ensuring of energy. Further, thermal power generation pollutes air because of combustion of oil or coal and has problems including inferior thermal efficiency and encouragement of global warming. Nuclear power generation requires substantial costs for constructing facilities and has problems about safety.

As described above, the conventional power generation apparatuses require substantial costs for constructing facilities and have problems including environmental pollution, air pollution, heat generation and stable supply of the energy.

A motor generally receives direct or alternating power to generate a rotating magnetic force and rotates a rotor by a magnetic attraction force which enables the rotor to follow the rotating magnetic force. Accordingly, in order to generate the rotating magnetic force, power corresponding to an output torque is supplied to the motor.

A magnetic rotating motor is known to operate as a generator when power supply to the motor is stopped and a rotor is rotated by an external force. Namely, the identical rotator structure (hardware) serves as a motor and as a generator. When the rotator structure receives power to provide a mechanical output, it is called a motor, and when it rotates a rotor by a mechanical turning force to generate power in a coil, it is called a generator. Conventionally, the identical rotator structure cannot exhibit the function of a motor and the function of a generator at the same time, and these functions are exhibited with a time lag therebetween. Although a single rotator structure conventionally has functions as a motor and as a generator, it cannot exhibit the function of a generator while exhibiting the function of a motor, and vice versa. In order to obtain the function of a motor and the function of a generator at the same time, a motor is mechanically coupled to a generator.

SUMMARY OF THE INVENTION

The present invention was developed in view of the above circumstances, and the object of the present invention is to provide a magnetic rotating motor generator which does not have problems including environmental pollution, air pollution, noise and heat generation, which is clean without requiring increased manufacturing costs, and which exhibits the function of a generator while exhibiting the function of a motor.

The present invention relates to a magnetic rotating motor generator, and the aforementioned object of the present invention is accomplished by providing a magnetic rotating motor generator comprising a rotating portion which is made of a non-magnetic substance whose periphery is provided with a group of permanent magnets tilted at a predetermined angle in an embedded manner; a group of electromagnets that are disposed adjacently to the rotating portion so as to oppose the group of permanent magnets; a positional sensor for detecting positions of the group of permanent magnets; a controller for applying an electric current to the electromagnet on the basis of a detected signal from the positional sensor; and a power generating section for obtaining power from coils of the electromagnet.

The aforementioned object of the present invention is accomplished by providing a magnetic rotating motor generator comprising a rotating portion which is made of a non-magnetic substance whose periphery is provided with a group of permanent magnets tiled at a predetermined angle in an embedded manner; a group of electromagnets that are disposed adjacently to the rotating portion so as to oppose the group of permanent magnets; a positional sensor for detecting positions of the group of permanent magnets; a controller which has a battery for applying a pulsed current to the electromagnet on the basis of a detected signal from the positional sensor; and a power generating section for obtaining power from coils of the electromagnet, wherein a rotation mode and a power generation mode are repeated, so that the power generation is performed while a function as a motor is exhibited and power obtained by the power generation is supplied to the controller in order to generate the pulsed current instead of the battery.

DETAILED DESCRIPTION OF THE PREFERRED EMBODIMENTS

According to the present invention, in a motor magnetic pole portion of a rotator structure, a magnetic field developed by an electromagnet and magnetic fields developed by a group of permanent magnets on a rotor repel one another. The magnetic field generated by a permanent magnet is deformed so as to be flat by magnetic fields of other adjacent permanent magnet and of the electromagnet. Then, a torque for rotating the rotor is generated between the permanent magnet and the electromagnet, so that the rotator structure is in a rotation mode and the rotor is rotated efficiently. During the time elapsed since the permanent magnet of the rotor passes through the electromagnet of the motor magnetic pole portion until the permanent magnet reaches an electromagnet of the next motor magnetic pole portion, the permanent magnet performs electromagnetic induction upon a coil of the electromagnet, so that the rotator structure is in a power generation mode and power is outputted from the coil of the electromagnet. The rotation mode based on the repulsion action between the permanent magnet and the electromagnet and the power generation mode based on the electromagnetic induction by the coil and the permanent magnet are repeated alternately. As a result, a single rotator structure exhibits a function as a generator as well as a function as a motor, and vice versa.

Since output power outputted as the result of the power generation function is a large percentage of input power for driving the motor, the present invention contributes to energy conservation. Further, by regenerating the output power for the input power, semipermanent drive is realized.

Considering that a magnetic rotating motor generator of the present invention is capable of performing functions as a motor and as a generator at the same time, the magnetic rotating motor generator is an innovative apparatus which has not been conventionally provided. The magnetic rotating motor generator of the present invention does not suffer problems such as environmental pollution, air pollution, noise and heat generation. Its manufacturing costs are not increased. Moreover, the magnetic rotating motor generator is clean and thus unrelated to pollution. Further, since heat generation does not occur, the structure is made of synthetic resins, resulting in its lightening and a decrease in manufacturing costs.

Figure 1:
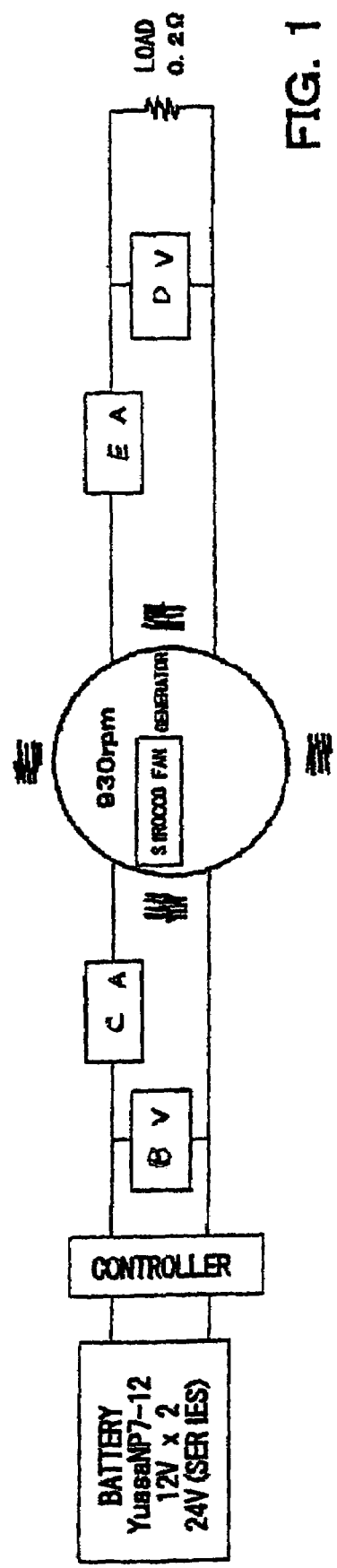
FIG. 1 is a schematic exterior view illustrating an example of a magnetic rotating apparatus.

The outline of a magnetic rotating apparatus (Japanese Patent No. 2968918 B2, U.S. Pat. No. 5,594,289 B1) serving as the assumption of the present invention will be described first. FIG. 1 schematically illustrates a magnetic rotating apparatus. Referring to FIG. 1, a rotating shaft 4 is rotatably fixed to a frame 2 with a bearing 5. Fixed to the rotating shaft 4 are magnetic rotators 6 and 8 which produce a turning force so as to be rotatable with the rotating shaft 4. Also fixed to the rotating shaft 4 is a rotated body 10 with rod-shaped magnets 9 for obtaining the turning force as energy mounted to its periphery so as to be rotatable with the rotating shaft 4. Electromagnets 12 and 14 which are energized in synchronous with rotations of the magnetic rotators 6 and 8 are disposed so as to oppose the magnetic rotators 6 and 8 respectively with magnetic gaps interposed therebetween. The electromagnets 12 and 14 are fixed to a yoke 16, which forms a magnetic path.

Figure 2:
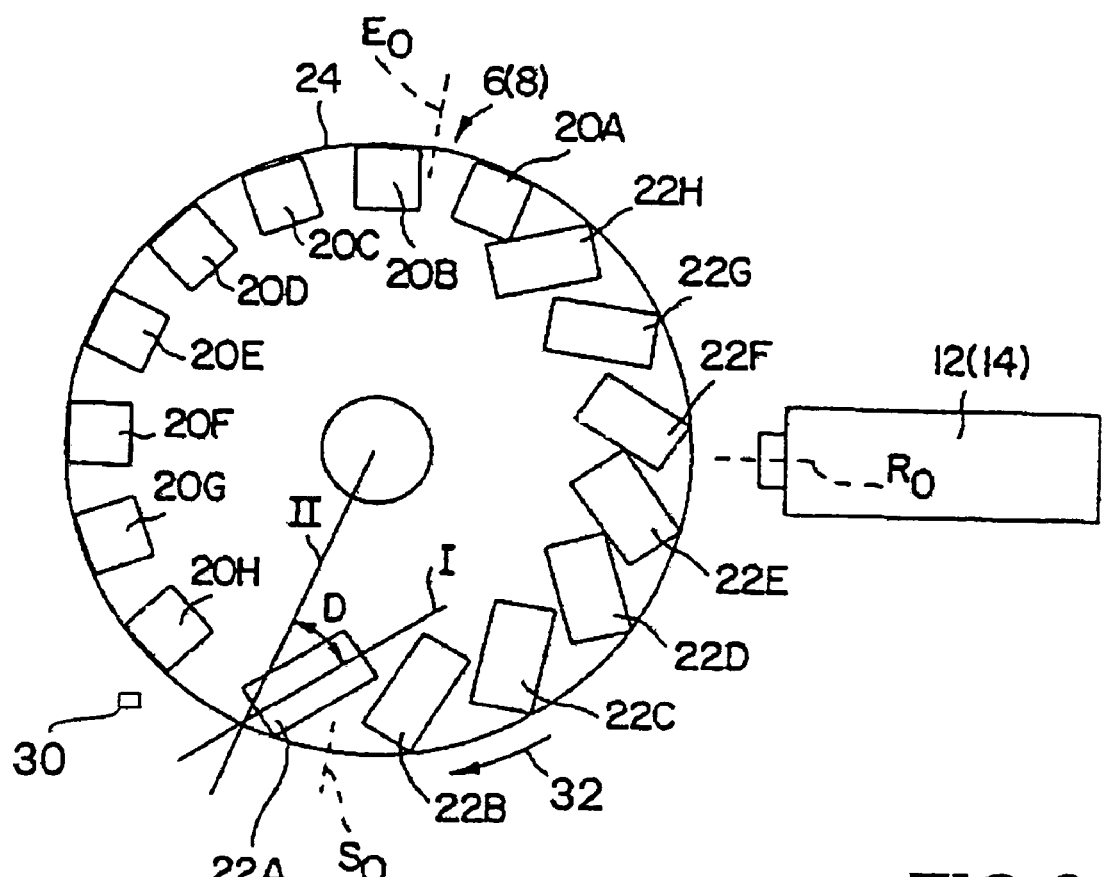
FIG. 2 is a flat view illustrating an example of a rotator of the magnetic rotating apparatus.

As illustrated in FIG. 2, in each of the magnetic rotators 6 and 8, tabular magnets 22A through 22H that generate a magnetic field for producing a turning force and balancers 20A through 20H made of non-magnetic substances, for balancing the magnetic rotators 6 and 8 are disposed on a disk 24. As illustrated in FIG. 2, each of the tabular magnets 22A through 22H is arranged so that its longitudinal axis I forms an angle D with respect to a radial axis line II of the disk 24. The angle D may be appropriately determined by the radius of the disk 24 and the number of the tabular magnets 22A through 22H to be disposed on the disk 24. From the standpoint of effective utilization of a magnetic field, the tabular magnets 22A through 22H on the magnetic rotator 6 are preferably arranged so that their N-poles point outward, while the tabular magnets 22A through 22H on the magnetic rotator 8 are preferably arranged so that their S-poles point outward.

The electromagnets 12 and 14 are disposed exterior to the magnetic rotators 6 and 8 so as to oppose the rotators 6 and 8 respectively with magnetic gaps being interposed therebetween. When energized, the electromagnets 12 and 14 develop a magnetic field which is identical in polarity to the respective tabular magnets 22A through 22H facing the electromagnets 12 and 14 so that they repel with one another. Namely, since the tabular magnets 22A through 22H on the magnetic rotator 6 have their respective N-poles face outward, the electromagnet 12 is energized so that its side facing the magnetic rotator 6 develops an N-polarity. Similarly, since the tabular magnets 22A through 22H on the magnetic rotator 8 have their respective S-poles face outward, the second electromagnet 14 is energized so that its side facing the magnetic rotator 8 develops an S-polarity. The electromagnets 12 and 14, which are magnetically coupled by the yoke 16, are magnetized so that the sides facing the respective tabular magnets 22A through 22H are magnetized so as to be opposite in polarity with each other. This means that magnetic fields for the electromagnets 12 and 14 can be utilized efficiently.

One of the magnetic rotators 6 and 8 is provided with a detector 30 for detecting a rotating position of the magnetic rotator 6 or 8. Namely, as illustrated in FIG. 2, in a direction 32 of rotation of the tabular magnets 22A through 22H, the magnetic rotators 6 and 8 are energized when the leading tabular magnet 22A has passed through the detector 30. In other words, in the direction 32 of rotation, the electromagnets 12 and 14 are energized when a start point $S_o$ located between the leading tabular magnet 22A and the following tabular magnet 22B coincides with the center point $R_o$ of the electromagnet 12 or 14. Further, as illustrated in FIG. 2, in the direction 32 of rotation of the tabular magnets 22A through 22H, the magnetic rotators 6 and 8 are de-energized when the last tabular magnet 22H has passed through the detector 30. An end point $E_o$ is set on the disk 24 so as to be symmetrical to the start point $S_o$. The electromagnets 12 and 14 are de-energized when the end point $E_o$ coincides with the center point $R_o$ of the electromagnet 12 or 14. When the rotators 6 and 8 start to be rotated, the center point $R_o$ of the electromagnet 12 or 14 is located at any position between the start point $S_o$ and the end point $E_o$ and the electromagnets 12 and 14 are made to oppose the respective tabular magnets 22A and 22H.

When a microswitch is used as the detector 30 for detecting the rotating position, a contact of the microswitch is made to slide along the peripheral surface of the disk 24. A step is provided for the start point $S_o$ and the end point $E_o$ so that the contact of the microswitch is closed between the start point $S_o$ and the end point $E_o$. The area on the peripheral surface between the start point $S_o$ and the end point $E_o$ is protruded beyond other peripheral areas of the disk 24. The detector 30 may be a non-contact sensor.

Figure 3:
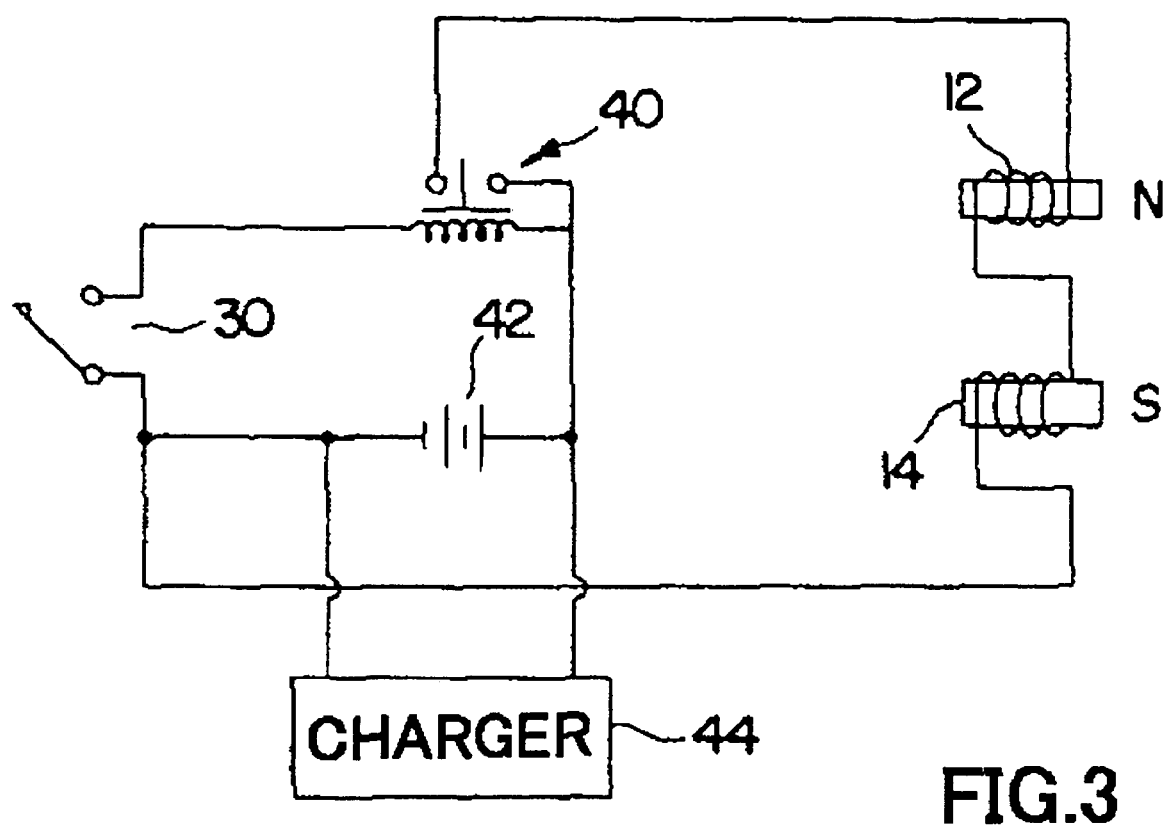
FIG. 3 is a circuit diagram illustrating a drive system of the magnetic rotating apparatus.

As illustrated in FIG. 3, coils for the electromagnets 12 and 14 are serially connected via a movable contact of a relay 40 to a DC power source 42. Connected to the DC power source 42 is a serial circuit containing the detector 30 in the form of a microswitch and a solenoid of the relay 40. A charger 44 such as a solar cell or the like is connected to the DC power source 42 in view of energy conservation. The DC power source 42 is constantly chargeable using solar energy or the like.

The detector 30 is turned on when the rotating disk 24 is located at a predetermined position, i.e., when the electromagnets 12 and 14 are made to oppose any of the respective tabular magnets 22A through 22H. Then, an electric current is supplied from the DC power source 42 via the relay 40 to the electromagnets 12 and 14. When the electric current is supplied to the electromagnets 12 and 14, the electromagnets 12 and 14 develops a magnetic field, so that the rotating disk 24 is rotated using the following principle.

Figure 4:
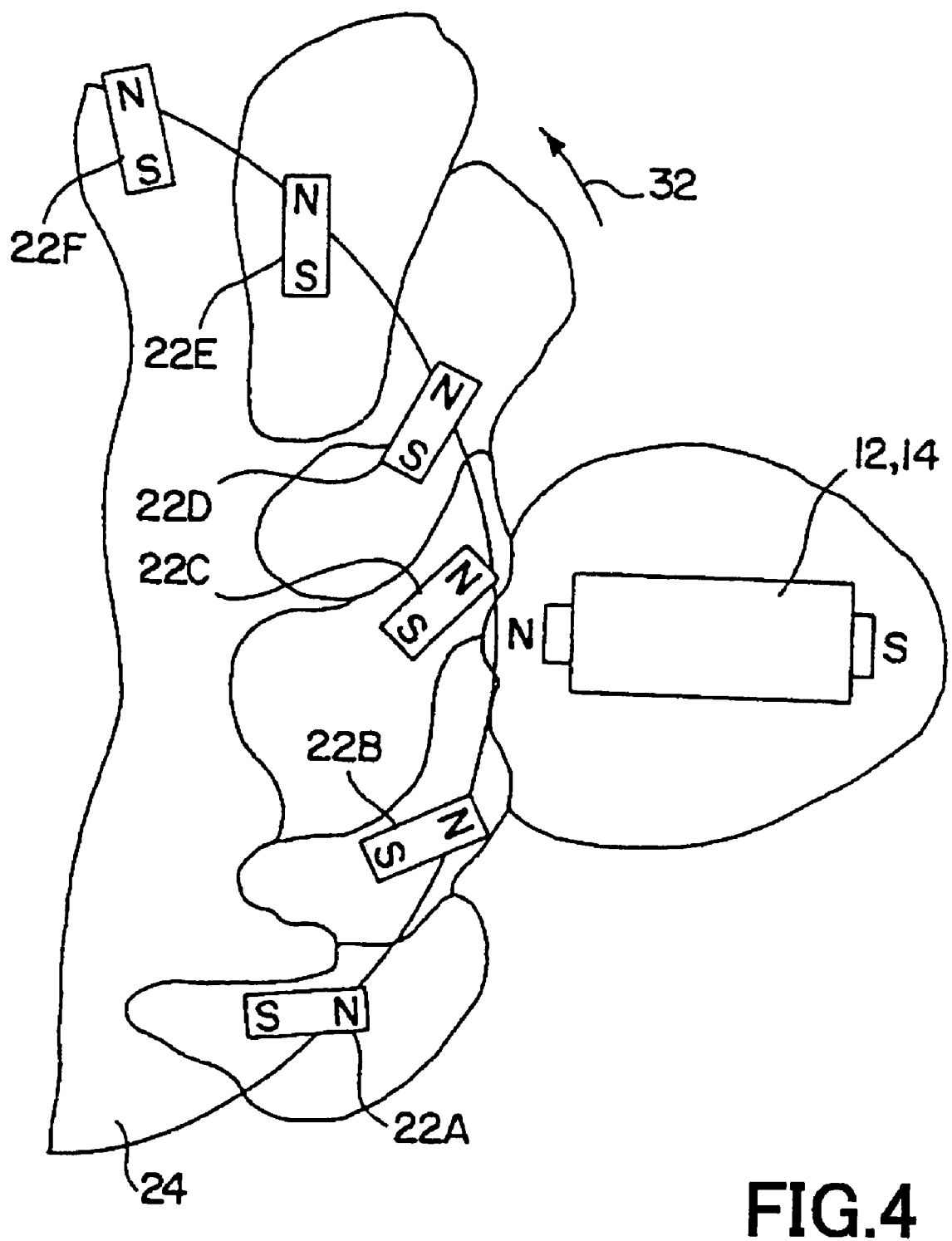
FIG. 4 is a view illustrating a state of rotating torque of the magnetic rotating apparatus.

The distribution of magnetic fields as illustrated in FIG. 4 is provided between the respective tabular magnets 22A through 22H of the magnetic rotators 6 and 8 and the corresponding electromagnets 12 and 14. When the electromagnets 12 and 14 are energized, a magnetic field of the tabular magnet 22A through 22H that is adjacent to the electromagnets 12 and 14 is distorted in a longitudinal direction corresponding to a direction of rotation, and a repulsive force is generated between the magnetic field of the tabular magnet and that of the electromagnet. This repulsive force has a larger component, which is perpendicular to the longitudinal direction as apparent from distortion of the magnetic field, so that a rotating torque indicated by the arrow 32 is generated. Similarly, a magnetic field of the tabular magnets 22A through 22H that subsequently enters the magnetic field of the electromagnets 12 and 14 is distorted by the magnetic field of the electromagnets 12 and 14 and directed toward the opposite polarity of the tabular magnets 22A through 22H that has already entered the magnetic field of the electromagnets 12 and 14. As a result, the magnetic field is even further distorted and flattened. The repulsive force between the tabular magnets 22A through 22H that has already entered the magnetic field of the electromagnets 12 and 14 and the electromagnets 12 and 14 is larger than that between the tabular magnets 22A through 22H that subsequently enters the magnetic field of the electromagnets 12 and 14 and the electromagnets 12 and 14, so that a turning force indicated by the arrow 32 acts upon the rotating disk 24. The rotating disk 24 which receives the turning force continues to be rotated by its inertial force even when the end point $E_o$ coincides with the center point $R_o$ of the electromagnets 12 and 14 and the electromagnets 12 and 14 is de-energized. The larger the inertial force is, the smoother the rotating disk 24 is rotated.

Figure 5:
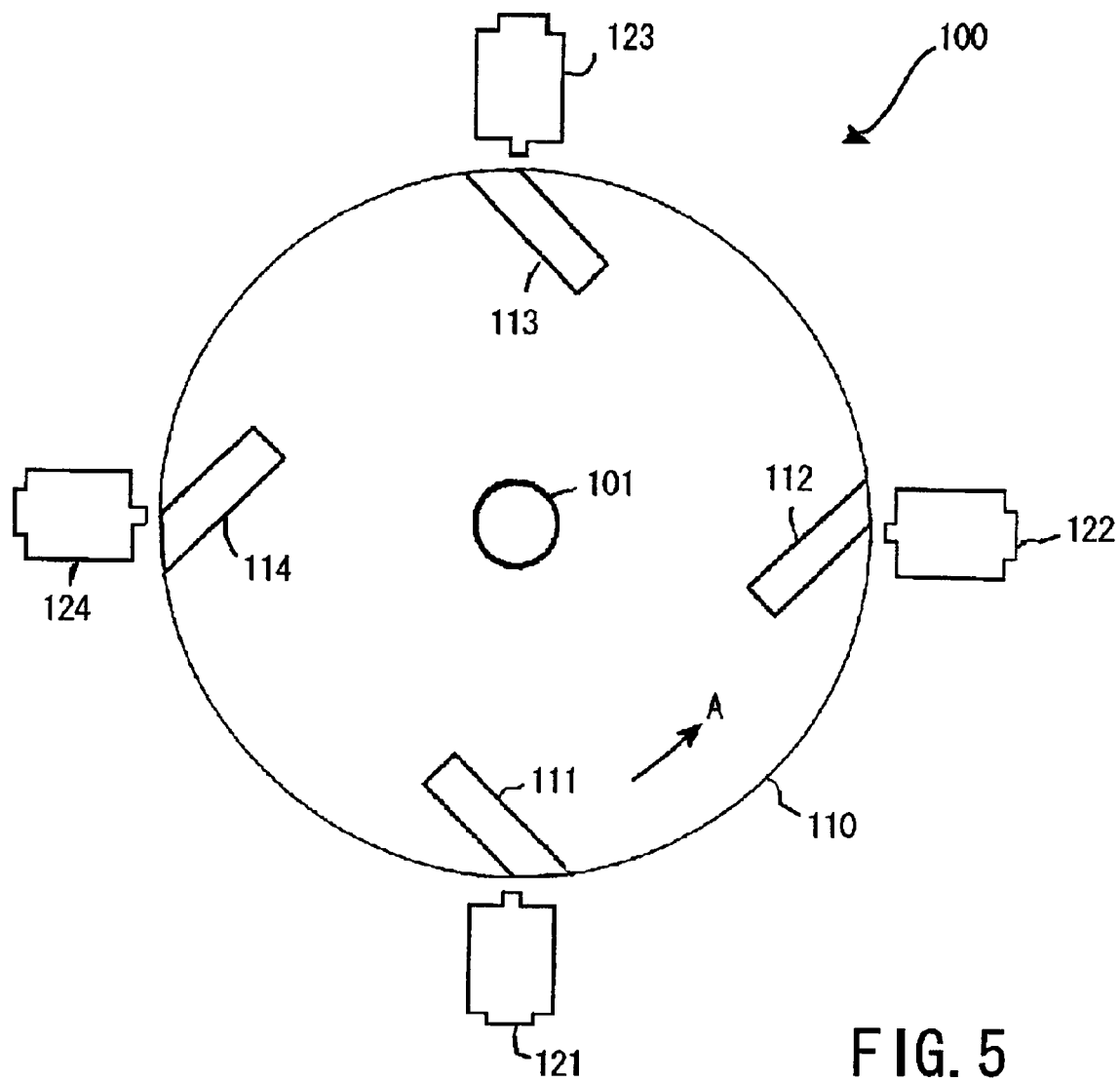
FIG. 5 is a cross-sectional mechanism view for explaining the principle of the present invention.

FIG. 5 is a cross-sectional mechanism view illustrating the principle of the present invention. In FIG. 5, a rotator structure 100 comprising functions as a motor and as a generator is provided. A rotating portion 110 made of a cylindrical or disk-shaped non-magnetic substance is mounted to a non-magnetic rotating shaft 101. Permanent magnets 111 through 114 as described above are located at four peripheral portions on the rotating portion 110 so as to be tilted at a predetermined angle (as illustrated in FIG. 2). Electromagnets 121 through 124 that receive a pulsed current at a predetermined timing are disposed so as to adjacently oppose the respective permanent magnets 111 through 114. Magnetic poles generated in the electromagnets 121 through 124 are respectively opposite to that of the permanent magnets 111 through 114.

When the rotating portion 110 is stopped, an attraction of magnetic force is established between the magnetic pole of the permanent magnets 111 through 114 and a yoke for the electromagnets 121 through 124. Accordingly, as illustrated in FIG. 5, the magnetic poles of the permanent magnets 111 through 114 respectively opposes the electromagnets 121 through 124.

Figure 6:
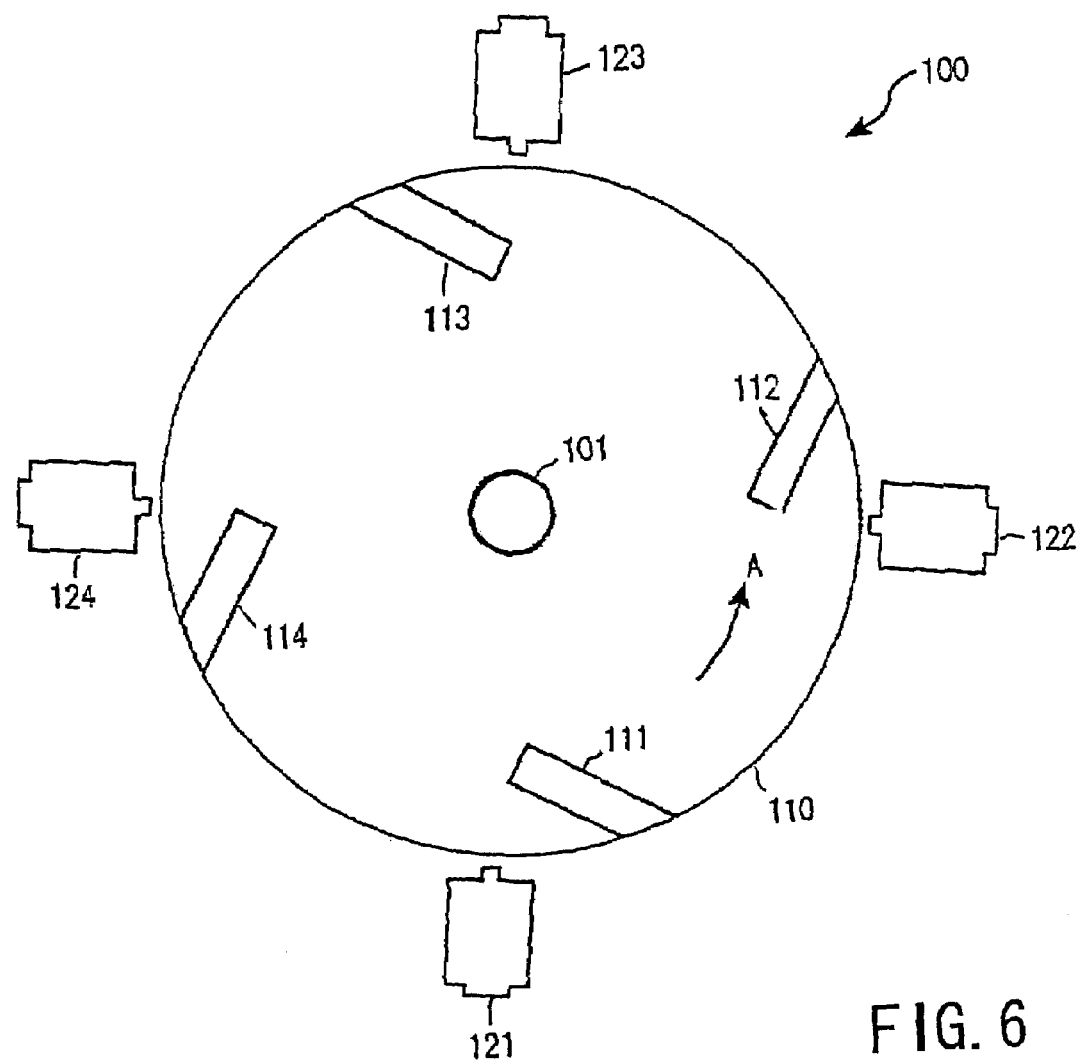
FIG. 6 is a cross-sectional mechanism view for explaining the principle of the present invention.
Figure 7:
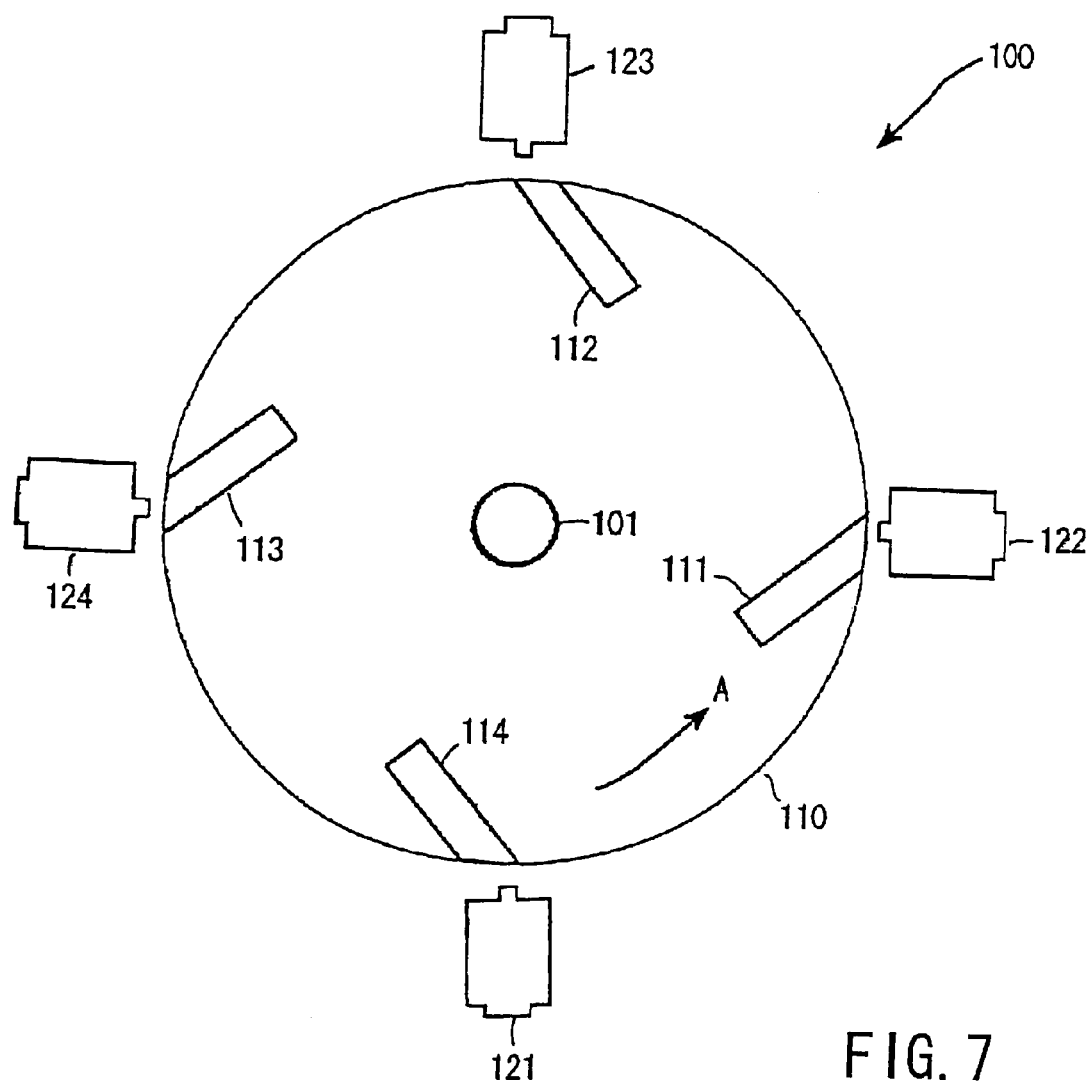
FIG. 7 is a cross-sectional mechanism view for explaining the principle of the present invention.
Figure 8:
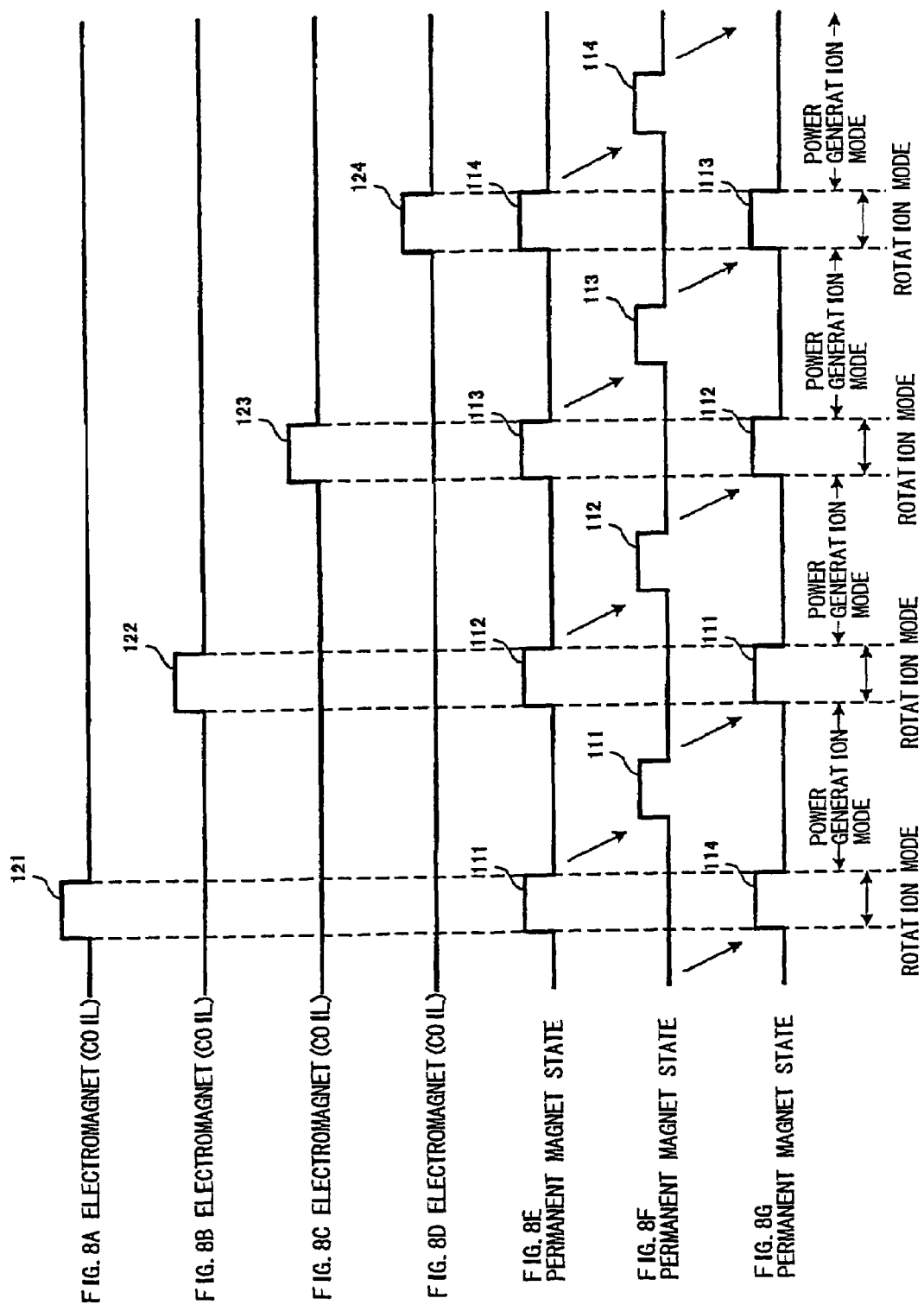
FIGS. 8A to 8G are views for explaining the principle of the present invention.

In the state illustrated in FIG. 5, the permanent magnets 111 through 114 oppose the electromagnets 121 through 124, respectively. Application of pulsed current to the electromagnets 121 through 124 generates repulsive actions between the magnetic fields of the electromagnets 121 through 124 and those of the permanent magnets 111 through 114, so that the rotator structure 100 is placed in a rotation mode. Then, the rotating portion 110 is rotated in a direction of the arrow "A". The rotator structure 100 is shifted to the state of FIG. 7 through the state illustrated in FIG. 6. When a pulsed current is similarly applied to the electromagnets 121, 122, 123 and 124 in the state of FIG. 7, repulsive actions are generated between the magnetic fields of the electromagnets 121, 122, 123 and 124 and those of the permanent magnets 114, 111, 112 and 113, so that the rotating portion 110 is rotated in the direction of the arrow "A". For example, during the time elapsed since the permanent magnet 111 is located at the position of the electromagnet 121 illustrated in FIG. 5 until it reaches the position of the electromagnet 122 illustrated in FIG. 7, lines of magnetic force for the permanent magnet 111 act on a coil wound around the electromagnet 121, so that an electric current is generated from the coil. The same action is occurred for the permanent magnets 112 through 114. An electric current is generated from the electromagnets 122 through 124 by electromagnetic induction from the respective permanent magnets 111 through 114. As a result, the rotator structure 100 is in a power generation mode. When the rotator structure 100 reaches the state illustrated in FIG. 7, application of pulsed current to the electromagnets 121, 122, 123 and 124 generates repulsive actions with respect to the respective permanent magnets 114, 111, 112 and 113, so that the rotator structure 100 is in the rotation mode. Then, a turning force in the direction of the arrow "A" is generated as described above. During the time elapsed since the permanent magnets 114, 111, 112 and 113 are located at the respective positions of the electromagnets 121, 122, 123 and 124 until they reaches the positions of the electromagnets 122, 123, 124 and 121, respectively, the rotator structure 100 is in the power generation mode. Then, an electric current is outputted from the coils wound around the electromagnets 121 through 124.

As described above, according to the rotator structure 100 of the present invention, a single structure may have the rotation mode and the power generation mode and a power generation is performed by rotation based on the rotation mode. Accordingly, unlike conventional examples, a generator needs not to be mechanically coupled to a motor. Further, unlike conventional examples, the motor needs not to be stopped in order to receive a rotational drive externally and output power. The best characteristic of the motor generator according to the present invention is that its ability of power generation while rotation of motor with small power.

FIGS. 8A through 8G illustrate the above-described operation in view of positional relationships between the electromagnets 121 through 124 and the permanent magnets 111 through 114. The electromagnets 121 through 124 are in the positional relationships as illustrated in FIGS. 8A through 8D. Initially, the permanent magnets 111 through 114 are in the state of FIG. 8E. Under such state, when the electromagnets 121 through 124 are driven by pulses, the rotator structure 100 is in the rotation mode by repulsion of magnetic forces so as to be in the state of FIG. 8F, for example, which corresponds to the power generation mode caused by electromagnetic induction. Since the rotating portion 110 continues to be rotated during the power generation mode, the rotator structure 100 is finally in the state of FIG. 8G. When the electromagnets 121 through 124 are driven by pulses in the state of FIG. 8G, the rotator structure 100 is in the rotation mode again by repulsion of magnetic forces and is even further rotated. At the same time, the rotator structure 100 is in the power generation mode by the electromagnet induction. By repeating the rotation mode and the power generation mode alternately, rotation and power generation are obtained at the same time.

Figure 9:
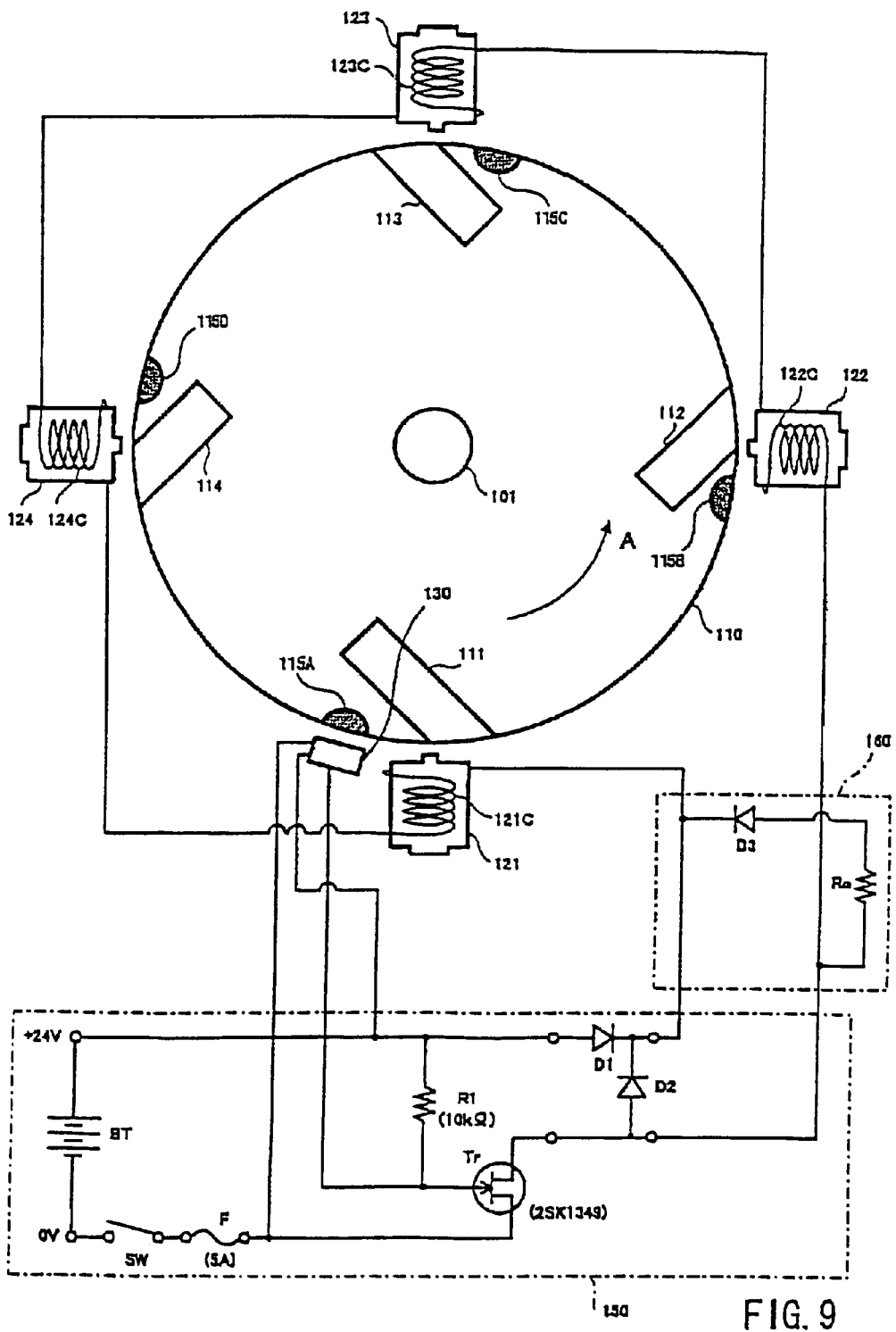
FIG. 9 is a connection diagram illustrating an example of the present invention.

FIG. 9 illustrates a connection diagram of the present invention. Referring to FIG. 9, coils 121C through 124C are wound around the electromagnets 121 through 124, respectively so as to develop magnetic fields for generating repulsion of magnetic forces with respect to the opposing permanent magnets 111 through 114 when receiving a pulsed current. Identification members 115A through 115D for detecting rotating positions of the permanent magnets 111 through 114 are disposed on the peripheral edge of the rotating portion 110 so as to correspond to the respective permanent magnets 111 through 114. A non-contact positional sensor (e.g., a hole sensor) 130 is provided externally and adjacently to the rotating portion 110.

The electromagnets 121 through 124 and the positional sensor 130 are connected to a controller 150. The controller 150 is driven by (e.g., 24V of) a battery BT. The battery BT is connected via a diode D1 to the coils 121C through 124C of the electromagnets 121 through 124. Further, the battery BT is connected via an FET transistor Tr which serves as switching means to generate a pulsed current and a fuse F to a power supply switch SW. The power source from the battery BT is also supplied to the positional sensor 130. The transistor Tr is turned on/off by a detected signal from the positional sensor 130. A resistor R1 is connected between a power source line and a gate line for the transistor Tr. A diode D2 is connected between the power source line and an output line for the transistor Tr.

Connected to the controller 150 is an output section 160 for obtaining a power output generated by electromagnetic induction of the coils 121C through 124C. The output section 160 includes a diode D3 for preventing input of applied pulses and a load resistor Ro.

In the above-described structure, when the power supply switch SW is turned on and the positional sensor 130 detects any of the identification members 115A through 115D, the transistor Tr is turned on and an electric current flows through the diode D1 to the coils 121C through 124C of the electromagnets 121 through 124 and magnetic forces are generated from the electromagnets 121 through 124. The magnetic forces of the electromagnets 121 through 124 and magnetic forces of the permanent magnets 111 through 114 repel one another. As a result, the apparatus is in the rotation mode and the rotating portion 110 is rotated in the direction indicated by the arrow "A". This rotation enables the permanent magnets 111 through 114 to be rotated from the respective positions of the electromagnets 121 through 124 to the respective positions of the electromagnets 122, 123, 124 and 121. During the rotation, the apparatus is in the power generation mode to perform power generation by the electromagnetic induction. When the permanent magnets 111, 112, 113 and 114 reaches the positions of the electromagnets 122, 123, 124 and 121, respectively, the apparatus is shifted from the power generation mode to the rotation mode. Subsequently, the rotation mode and the power generation mode are repeated alternately.

In this case, power is obtained from the output section 160. This power is measured by measuring a voltage and an electric current applied to the load Ro. Input power applied to the coils 121C through 124C is also measured. Excess power is utilized for other work.

Figure 10:
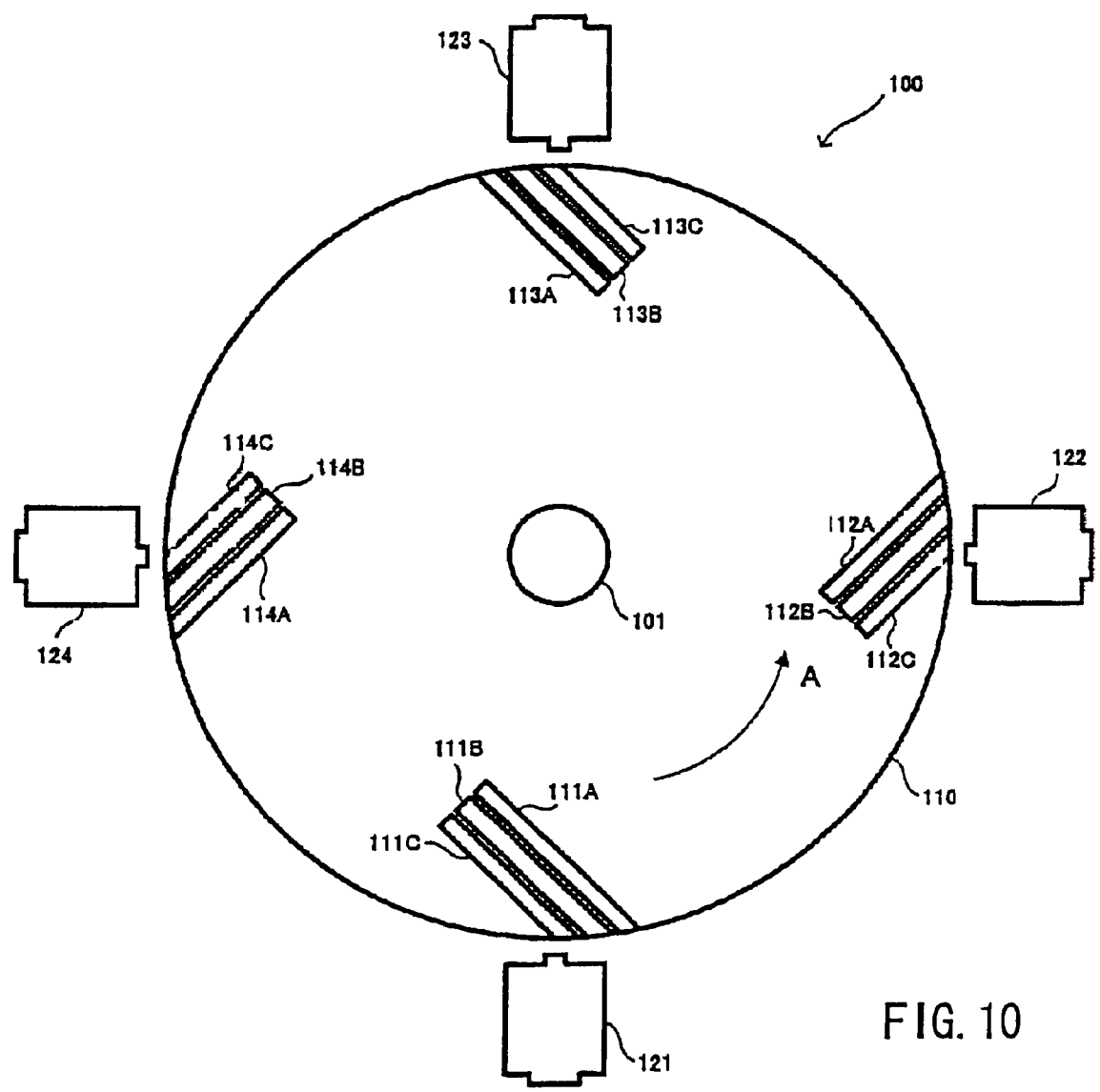
FIG. 10 is other principle view of the present invention.

In the above-described examples, each of the permanent magnets 111 through 114 disposed on the peripheral edge of the rotating portion 110 in a tilted manner is formed of a single magnet. Alternatively, as illustrated in FIG. 10, a permanent magnet may be provided by arranging a plurality of magnets such as three permanent magnets 111A through 111C, 112A through 112C, 113A through 113C or 114A through 114C. In this case, the corresponding number of opposing electromagnets may be provided. In the above description, four permanent magnets (four poles) are disposed on the rotating portion and four electromagnets are provided externally and adjacently to the rotating portion. Nevertheless, any number of pairs of (any number of poles of) permanent magnets and electromagnets may be provided as long as the number of the permanent magnets is the same as that of the electromagnets.

Although the electromagnets are driven by receiving a pulsed current in the above description, the present invention does not restrict to the pulsed current.

Figure 11:
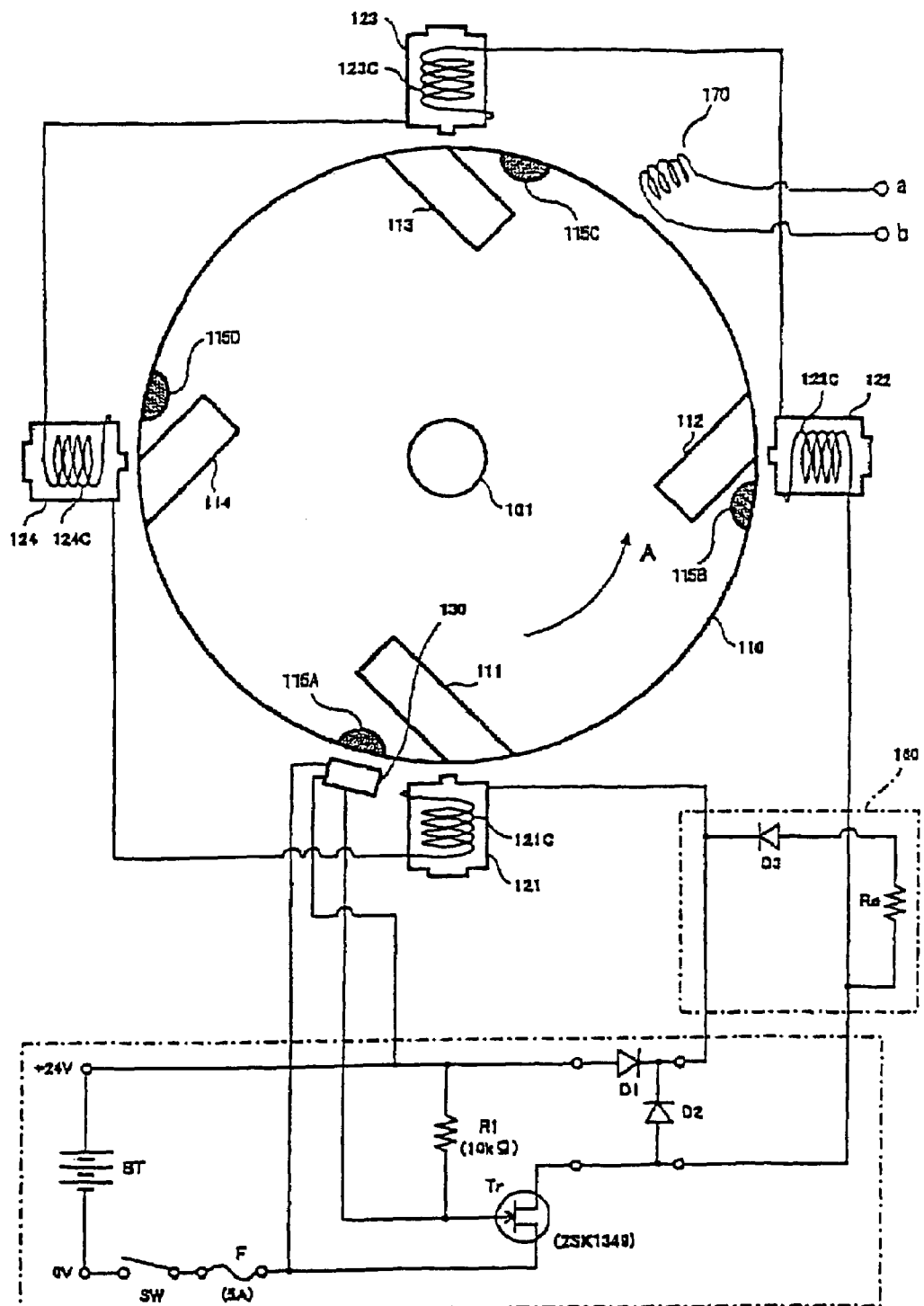
FIG. 11 is a connection diagram illustrating another example of the present invention.
Figure 13:
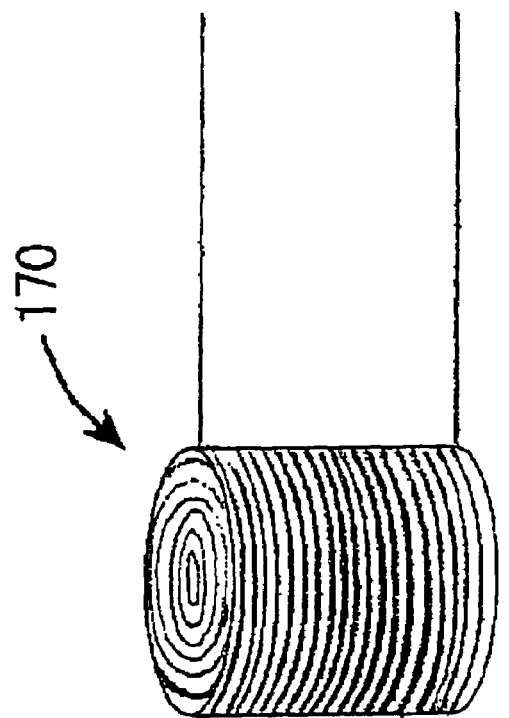
FIG. 13 is an exterior view illustrating another structural example of a coil for power generation.
Figure 12:
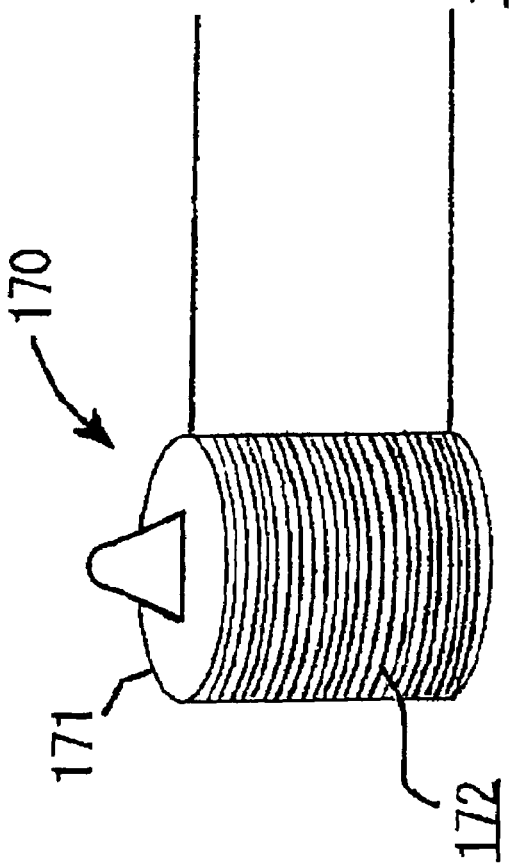
FIG. 12 is an exterior view illustrating a structural example of a coil for power generation.

FIG. 11 illustrates another embodiment of the present invention. Referring to FIG. 11, a coil 170 for power generation is provided externally and adjacently to the rotating portion 110. According to rotation of the rotating portion 110A, electromagnetic induction is occurred between the coil 170 for power generation and the permanent magnets 111 through 114, so that power is generated between ends "a" and "b" of the coil 170 for power generation. The coil 170 for power generation is formed by winding a winding 172 around a cylindrical core 171 as illustrated in FIG. 12A or by winding a winding 173 in a cylindrical manner as illustrated in FIG. 13. As the number of windings is increased, generated power becomes larger. The generated power also becomes larger as the distance between the coil for power generation and the rotating portion 110 is shorter.

EXAMPLES

A description will be given of examples that power generation is performed by rotating a sirocco fan with a motor generator formed of four permanent magnets and four electromagnets as illustrated in FIG. 9. Coils for the four electromagnets have a diameter φ of 0.6 mm and the number "n" of windings is "600". Batteries (Yuasa NP7-12) with 12V each are serially connected in order to supply 24V of voltage.

Figure 14:
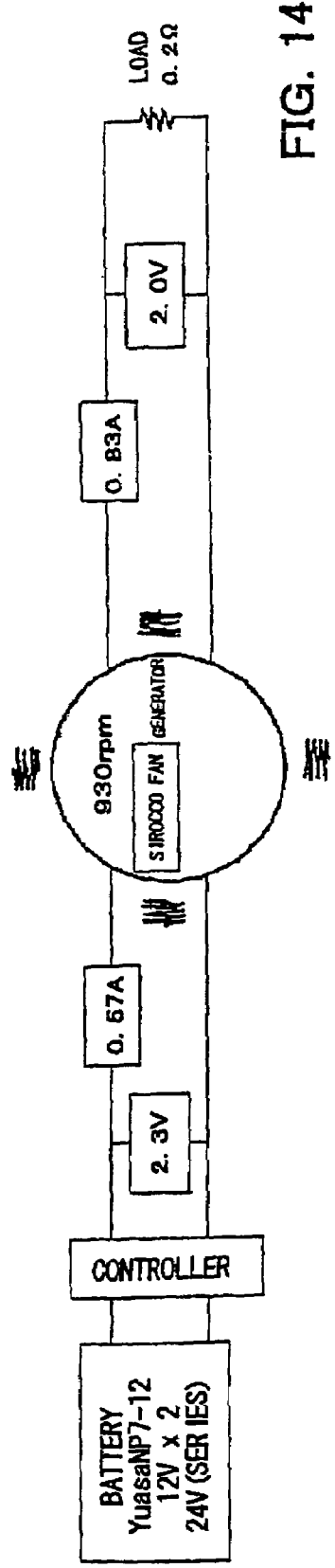
FIG. 14 is a view illustrating an example of the present invention.

(1) In an example illustrated in FIG. 14, a load Ro is 0.2Ω, an input voltage is B V and an input electric current is C A.

The motor generator performs 930 rpm of rotation as a motor and outputs D V of output voltage and E A of output electric current.

Figure 15:
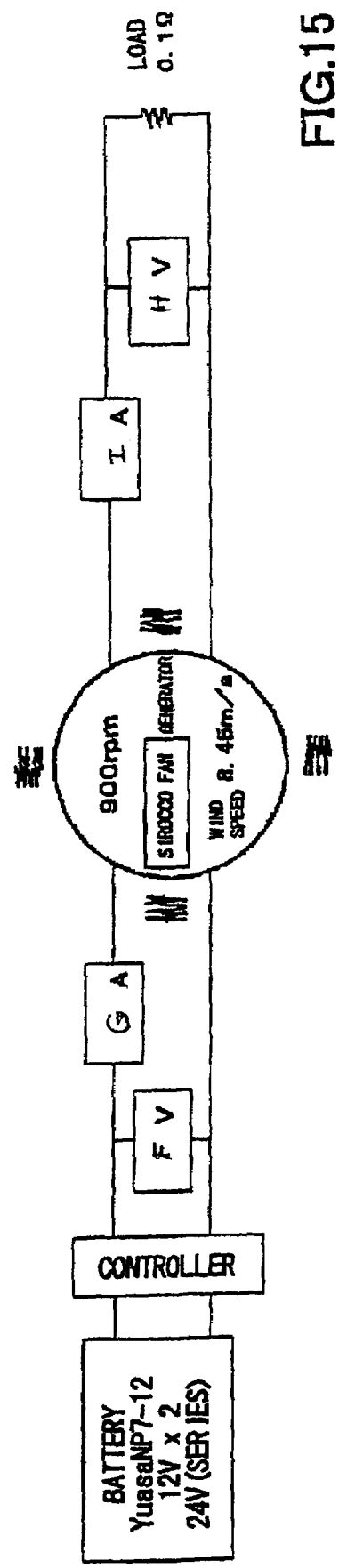
FIG. 15 is a view illustrating another example of the present invention.

(2) In an example illustrated in FIG. 15, the load Ro is 0.1Ω, the input voltage is F V and the input electric current is G A. The motor generator performs 900 rpm of rotation as a motor and outputs H V of output voltage and I A of output electric current.

Figure 16:
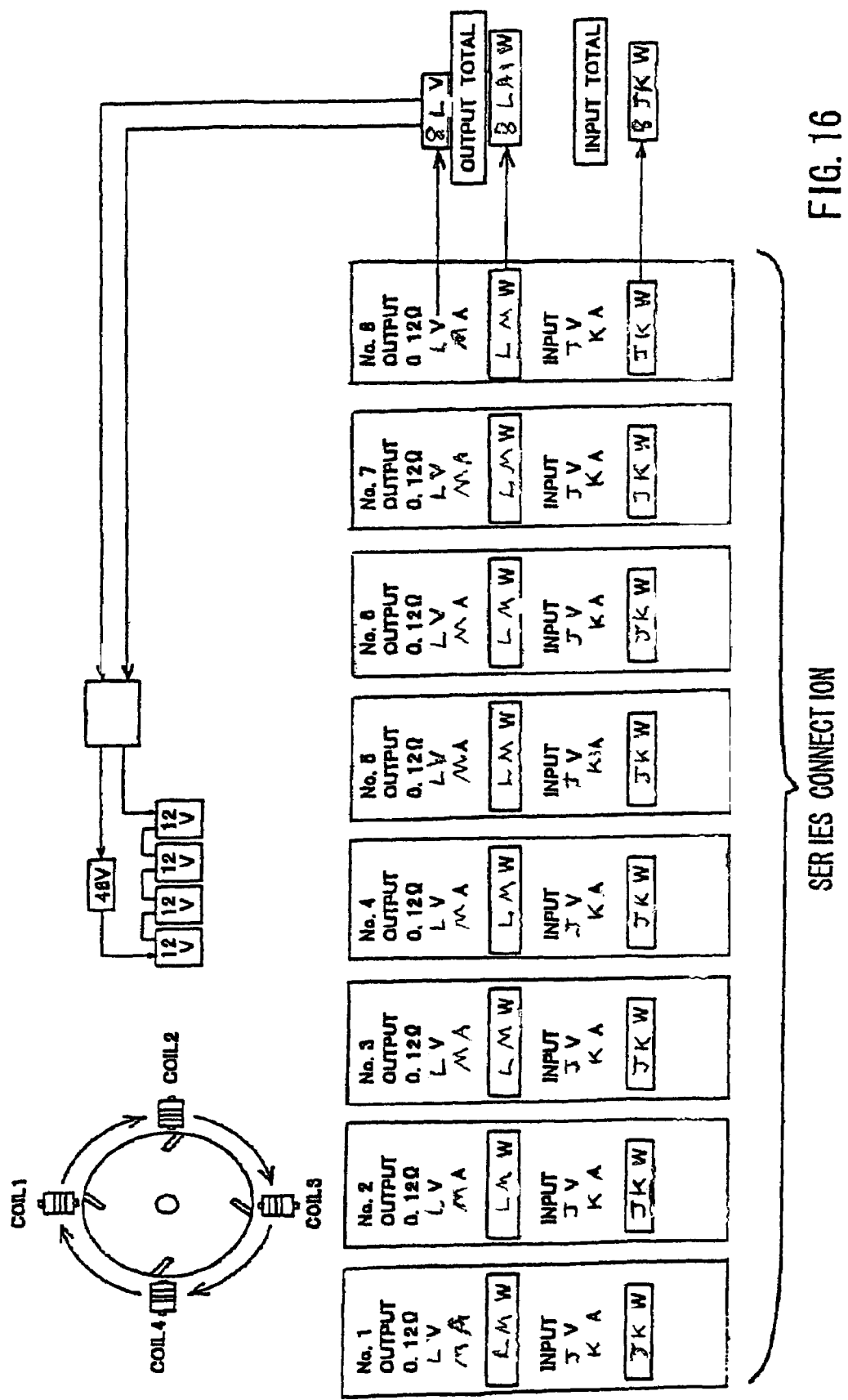
FIG. 16 is a view illustrating yet another example of the present invention.

(3) FIG. 16 illustrates an example in which output power is regenerated and utilized for an input side. According to this example, four batteries with 12V each are used to apply 48V of pulses to coils 1 through 4. Since a higher voltage than 48V of batteries is required for regeneration, eight motor generators with input voltages and output voltages indicated by blocks Nos. 1 through 8 in FIG. 16 are serially connected. The resultant voltage is regenerated for the input side so as to function as a battery power source. Namely, power is obtained while the motor is rotated without using the battery power source.

In the example illustrated in FIG. 16, each of the motor generators Nos. 1 through 8 has JK W (J V×K A of input power and LM W (L V×M A) of output power.

Figure 17:
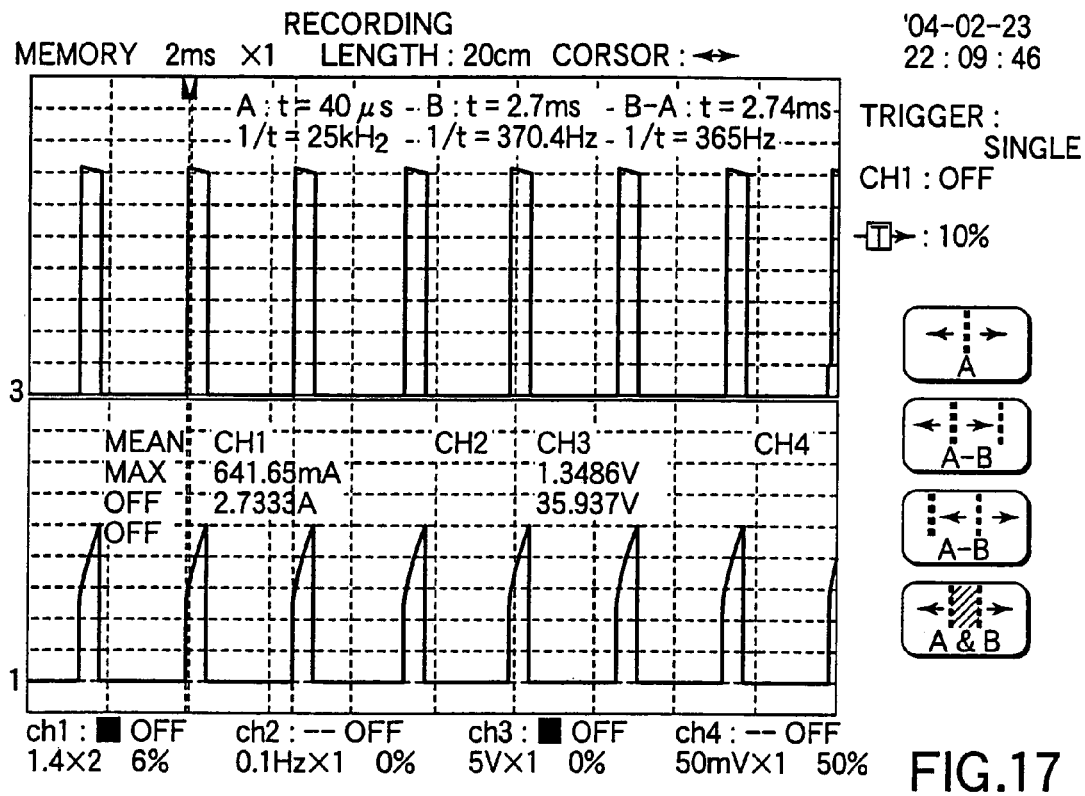
FIG. 17 is a graph illustrating an actual example of input waveforms (voltage and electric current)
Figure 18:
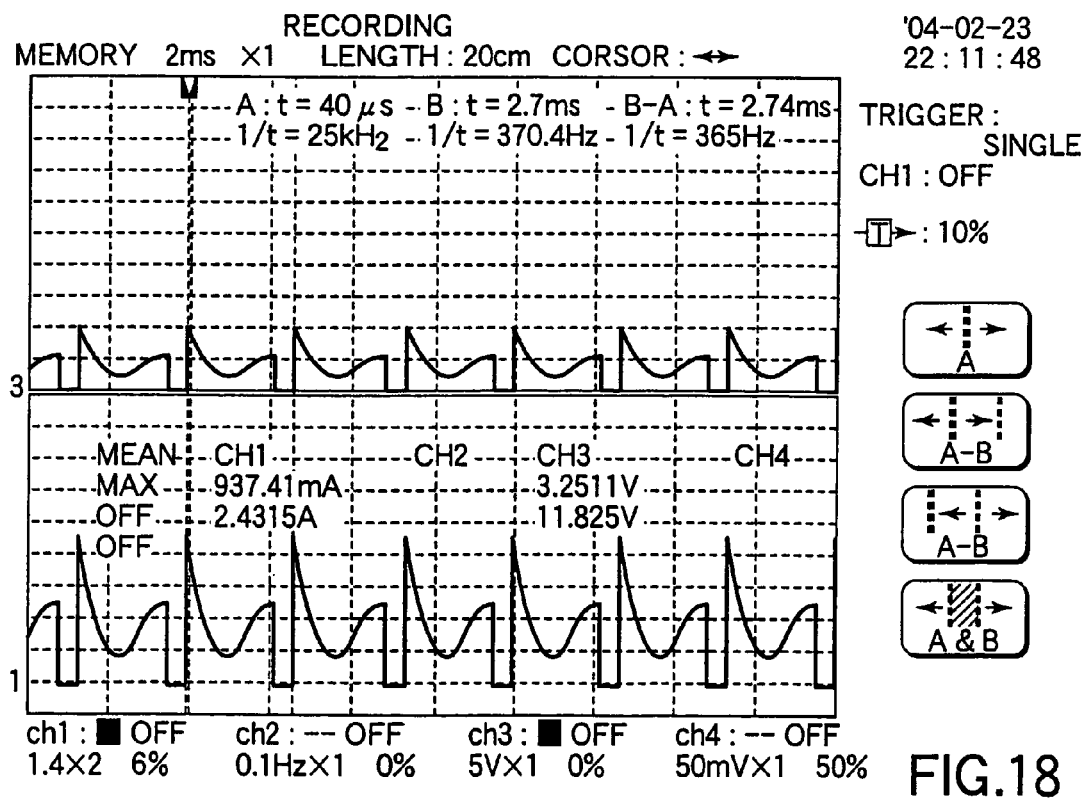
FIG. 18 is a graph illustrating an actual example of output waveforms (voltage and electric current).
Figure 19:
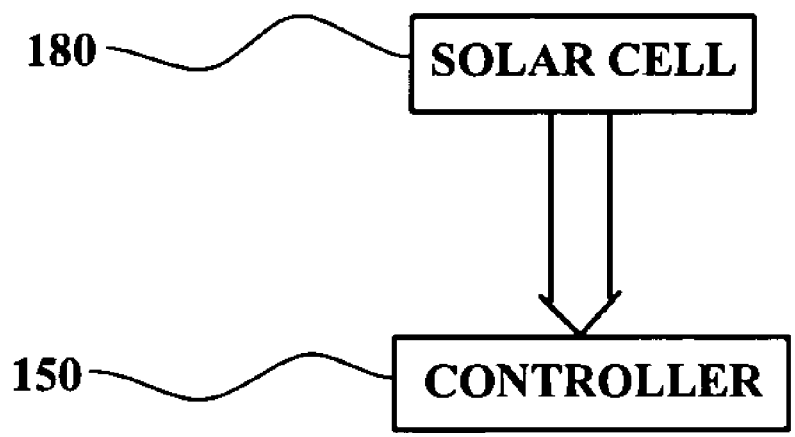
FIG. 19 is a schematic diagram showing a solar cell connected to the controller.

(4) FIG. 17 illustrates, by Japanese format, an actual example of input waveforms (voltage and electric current) and output waveforms (voltage and electric current). FIG. 17 illustrates waveforms for the input voltage (upper side) and the input electric current (lower side). FIG. 18 illustrates waveforms for the output voltage (upper side) and the output electric current (lower side).

According to the present invention, the amount of electric current to be supplied to an electromagnet is restricted as less as possible and electromagnetic energy of a permanent magnet is obtained as a turning force. Accordingly, electric energy to be supplied to the electromagnet is minimized and rotational energy is efficiently obtained from the permanent magnet. Further, power is outputted from the electromagnet (coil) at the same time of rotation and the output power is larger than input power for driving a motor. As a result, the present invention is of vital use to all of apparatuses consuming energy (automobiles, motorcycles, trains, home electrical appliances and the like) and industries (production business, transport business and the like).

Since a magnetic rotating motor generator of the present invention obtains functions as a motor and as a generator with a single rotator structure at the same time, its compactness is realized, a rotational drive force of a motor is obtained with decreased noise and vibration and clean power is obtained efficiently without heat generation. Since heat generation is not occurred, synthetic resins may be utilized for parts other than a shaft and a bearing, resulting in compactness and inexpensive manufacturing costs.

According to the present invention, since functions as a motor and as a generator are obtained by a single rotator structure, a compact motor generator with high performance is realized. Further, power is generated while rotation of a mechanical shaft is obtained. Accordingly, the present invention may be utilized for a wide range of industries. Moreover, since power outputted by the function as a generator is a large percentage of power required for motor drive, semipermanent rotation of a motor is obtained by regeneration of power rather than energy conservation. The present invention is effectively utilized for all industries requiring rotating mechanisms.

What is claimed is:

1. A magnetic rotating motor generator comprising:
    a rotating portion having a shaft on which it turns, with disks extending from the shaft, said shaft and disks being made of a non-magnetic substance, and the periphery of the disks is provided with a group of permanent magnets tilted at a predetermined angle in an embedded manner;
    a group of electromagnets that are disposed adjacently to the rotating portion so as to oppose the group of permanent magnets;
    a positional sensor for detecting rotational positions of the group of permanent magnets;
    a controller for applying an electric current to the electromagnet on the basis of a detected signal from the positional sensor; and
    a power generating section for obtaining power from a coil of the electromagnet,
    wherein a rotation mode and a power generation mode are alternated when the controller periodically applies the electric current to the electromagnet, so that power generation is performed while a function as a motor is exhibited.

2. A magnetic rotating motor generator according to claim 1, wherein the group of permanent magnets are provided in such a manner that a plurality of sets of permanent magnets each of which comprises a plurality of tabular permanent magnets are disposed at a plurality of positions.

3. A magnetic rotating motor generator according to claim 1, wherein the rotation mode is provided when the group of permanent magnets opposes the group of electromagnets.

4. A magnetic rotating motor generator according to claim 1, wherein the power generation mode is provided when the group of permanent magnets are located between the group of electromagnets.

5. A magnetic rotating motor generator according to claim 1, wherein the rotating portion is formed in a disk or cylindrical shape.

6. A magnetic rotating motor generator according to claim 1, wherein a solar cell is connected to the controller.

7. A magnetic rotating motor generator according to claim 1, wherein a pulsed current is applied to the electromagnet.

8. A magnetic rotating motor generator according to claim 1, wherein a coil for power generation is disposed so as to be adjacent to the rotating portion, and power is obtained from the coil for power generation according to rotation of the rotating portion.

9. A magnetic rotating motor generator according to claim 8, wherein a plurality of coils for power generation are provided.

10. A magnetic rotating motor generator comprising:
    a rotating portion having a shaft on which it turns, with disks extending from the shaft, said shaft and disks being made of a non-magnetic substance, and the periphery of the disks is provided with a group of permanent magnets tilted at a predetermined angle in an embedded manner;
    a group of electromagnets that are disposed adjacently to the rotating portion so as to oppose the group of permanent magnets;
    a positional sensor for detecting rotational positions of the group of permanent magnets;
    a controller which has a battery for applying a pulsed current to the electromagnet on the basis of a detected signal from the positional sensor; and
    a power generating section for obtaining power from a coil of the electromagnet, wherein a rotation mode and a power generation mode are alternated when the controller periodically applies the pulsed current to the electromagnet, so that power generation is performed while a function as a motor is exhibited and power obtained by the power generation is supplied to the controller in order to generate the pulsed current.

11. A magnetic rotating motor generator according to claim 10, wherein a coil for power generation is disposed so as to be adjacent to the rotating portion and output power from the coil for power generation is obtained separately.

12. A magnetic rotating motor generator according to claim 11, wherein a plurality of coils for generation are provided.

13. A magnetic rotating motor generator comprising:
a rotating portion having a shaft on which it turns, with disks extending from the shaft, said shaft and disks being made of a non-magnetic substance, and the periphery of the disks is provided with a group of permanent magnets tilted at a predetermined angle in an embedded manner;

a group of electromagnets that are disposed adjacently to the rotating portion so as to oppose the group of permanent magnets;

a positional sensor for detecting positions of the group of permanent magnets;

a controller for applying an electric current to the electromagnet on the basis of a detected signal from the positional sensor; and a power generating section for obtaining power from a coil of the electromagnet, wherein the power generating section is provided for obtaining power from a coil of the electromagnet when the controller is not applying an electric current to the electromagnet.

14. The magnetic rotating motor generator of claim 13, wherein the controller is provided for applying the electric current as a pulsed current.

* * * * *